(12) United States Patent
Butt

(10) Patent No.: US 7,418,821 B2
(45) Date of Patent: Sep. 2, 2008

(54) AIRCRAFT GAS TURBINE ENGINES

(75) Inventor: David C. Butt, Derby (GB)

(73) Assignee: Rolls-Royce PLC, London (GB)

( * ) Notice: Subject to any disclaimer, the term of this patent is extended or adjusted under 35 U.S.C. 154(b) by 574 days.

(21) Appl. No.: 11/049,748

(22) Filed: Feb. 4, 2005

(65) Prior Publication Data

US 2005/0188704 A1 Sep. 1, 2005

(30) Foreign Application Priority Data

Feb. 28, 2004 (GB) ................................. 0404471.5

(51) Int. Cl.
*F02C 7/22* (2006.01)
*F02C 7/26* (2006.01)
(52) U.S. Cl. .......................................... 60/778; 60/786
(58) Field of Classification Search .................... 60/778, 60/786
See application file for complete search history.

(56) References Cited

U.S. PATENT DOCUMENTS

| 3,769,790 | A | * | 11/1973 | Thebert ...................... 60/39.08 |
| 4,062,185 | A | | 12/1977 | Snow |
| 4,684,081 | A | * | 8/1987 | Cronin ......................... 244/58 |
| 5,694,765 | A | | 12/1997 | Hield et al. |
| 5,867,979 | A | * | 2/1999 | Newton et al. .............. 60/226.1 |
| 7,204,090 | B2 | * | 4/2007 | O'Connor ..................... 60/778 |
| 2006/0042252 | A1 | * | 3/2006 | Derouineau .................. 60/703 |

FOREIGN PATENT DOCUMENTS

EP  0 079 845 A1  5/1983

* cited by examiner

*Primary Examiner*—William H Rodriguez
(74) *Attorney, Agent, or Firm*—Oliff & Berridge, PLC

(57) ABSTRACT

An aircraft gas turbine engine including a first hydraulic pump connected to a starter motor and a second hydraulic pump connected to the high-pressure compressor. The engine being arranged such that during starting the starter motor drives the first pump, to pump hydraulic fluid to operate the second pump as a motor to drive the high pressure compressor. During running the first and second pumps are connected to the aircraft hydraulic system.

13 Claims, 4 Drawing Sheets

AIRCRAFT GAS TURBINE ENGINES

BACKGROUND

This invention concerns improvements in or relating to aircraft gas turbine engines, and also a method of starting aircraft gas turbine engines.

The disclosure of U.S. Pat. No. 5,694,765 is incorporated herein by reference.

In modern aircraft there is generally an increasing requirement for electric power. Such increased electric power may be required for additional cabin services and particularly for use in providing the cabin air supply. FIGS. 2 and 3 diagrammatically show a conventional arrangement to allow various accessories to drive or be driven by the engine of an aircraft.

In more detail, FIGS. 2 and 3 of the drawings show an external gearbox 110 which connects to a starter motor 112 and first and second hydraulic pumps 114, 116. The gearbox 110 connects via a gearbox drive shaft 118 bevelled gears 120 to an angled drive shaft 122. The drive shaft 122 connects via gears 124 to a radial drive shaft 126. The drive shaft 126 connects via bevelled gears 128 to the high pressure compressor 130. The intermediate pressure compressor 132 is also shown.

In use, to start an engine the starter motor 112 is powered which drives the high pressure compressor 130 through the arrangement described above. Once the engine is running the high pressure compressor 130 will drive the gearbox 110 and the attached units including hydraulic pumps 114 and 116.

As indicated above, modern aircraft generally require an increased power to be extracted by the engine to drive accessories. With the above described arrangement, at the top of descent when the engine power is reduced, the large power offtake requirement would lead to an engine surge. This problem could be solved by driving the gearbox from the intermediate pressure compressor rather than the high pressure compressor to ensure that the compressors do not surge at the top of descent conditions.

This would however lead to other issues in starting the engine. With such an alternative arrangement during a start the starter motor would drive the intermediate pressure compressor rather than the high pressure compressor. This would require a very long time to start the engine if the engine would in fact start, as the high pressure compressor would only be induced to rotate by airflow, and would not be positively driven. It therefore is necessary to positively drive the high pressure compressor.

SUMMARY

According to the present invention there is provided an aircraft gas turbine engine, the engine including a first compressor and a second compressor of higher pressure than the first compressor; a starter motor; at least a second energy transfer machine; characterised in that the engine also includes first drive means which connects the first compressor to the starter motor; second drive means which connects the second compressor to the second machine; and machine connection means for interconnecting the starter motor and the second machine, and also connecting the second machine to an aircraft power system, the machine connection means being arranged to selectively either in a first condition interconnect the starter motor and second machine, or in a second condition connect the second machine to the aircraft power system.

A first energy transfer machine may be provided which is connected by the first drive means to the first compressor, and which is connected to the machine connection means.

The first and second drive means may include respective drive shafts which extend substantially perpendicularly from the first and second compressors, and the first and second drive shafts are preferably concentric.

The first drive means preferably includes a gearbox which connects to the starter motor and the first energy transfer machine. The gearbox is preferably driven from the first drive shaft.

The machine connection means preferably includes a plurality of three way valves or switches.

The invention also provides a method of starting a gas turbine engine according to any of the preceding five paragraphs, the method including interconnecting the first and second energy transfer machines and operating the first machine to transfer energy to the second machine such that the second machine drives the second compressor through the second drive means, and following starting connecting the first and second machines respectively to the aircraft power system.

The first machine may be operated during starting to deliver energy to the second machine such that the second machine acts as a motor to drive the second compressor.

BRIEF DESCRIPTION OF THE DRAWINGS

An embodiment of the present invention will now be described by way of example only and with reference to the accompanying drawings, in which.

DETAILED DESCRIPTION OF EMBODIMENTS

Figure 1:
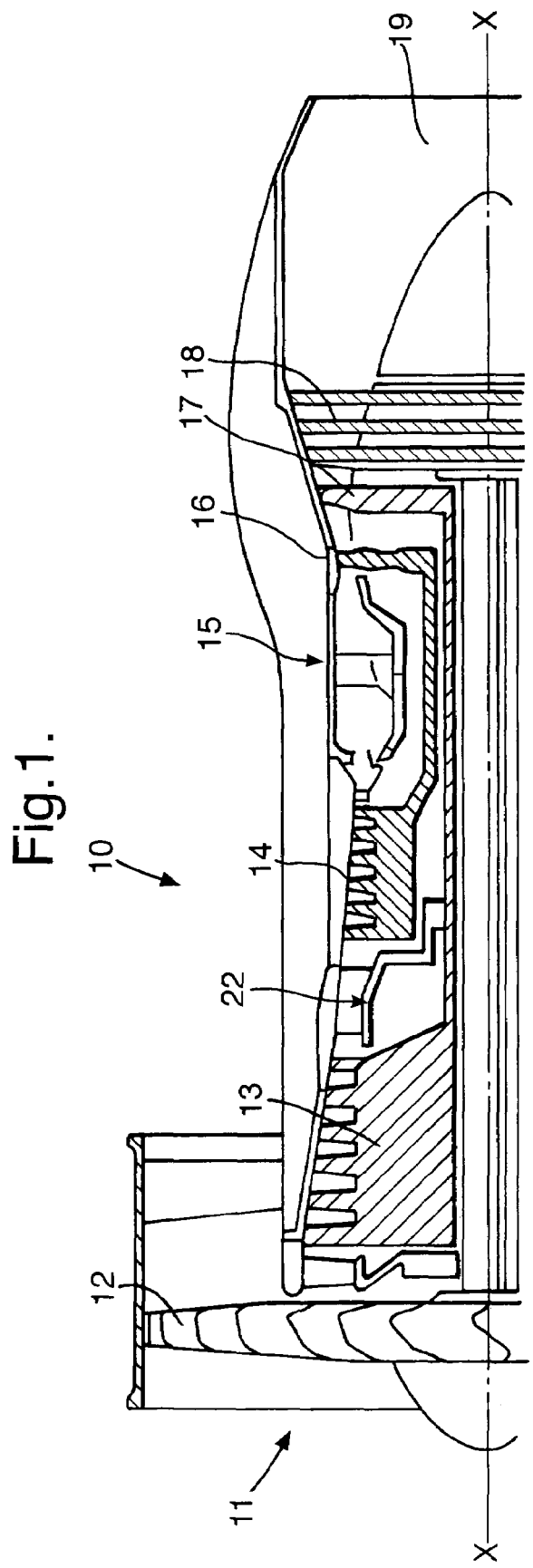
FIG. 1 is a diagrammatic cross sectional view through part of a gas turbine engine according to the invention.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine for an aircraft 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

FIGS. 4-7 show an arrangement 20 located between the intermediate and high pressure compressors 13, 14 and whose location is indicated diagrammatically at 22 on FIG. 1. The arrangement 20 is usable in starting the engine 10 and also providing a power takeoff during running of the engine 10.

Figure 2:
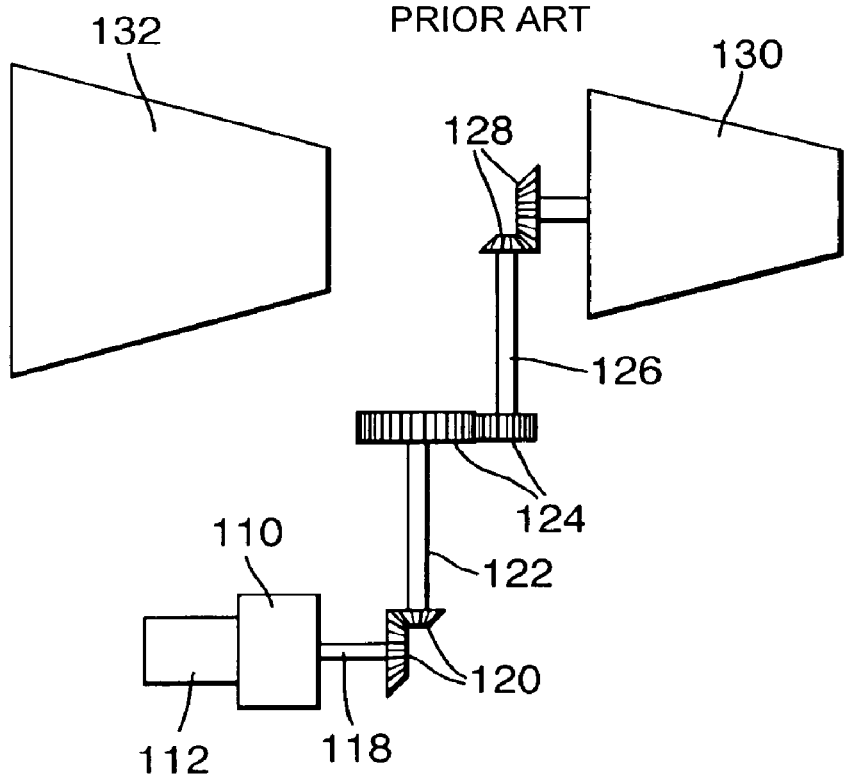
FIG. 2 is a diagrammatic sectional view through part of a conventional gas turbine engine.
Figure 3:
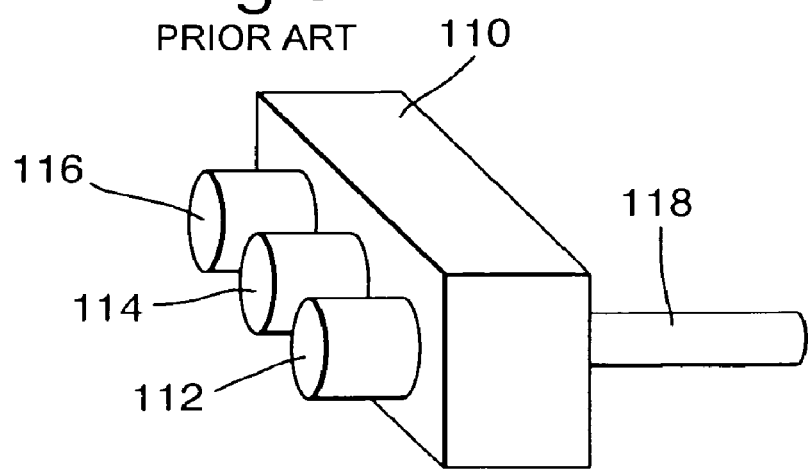
FIG. 3 is a diagrammatic perspective view of part of the engine of FIG. 2.
Figure 4:
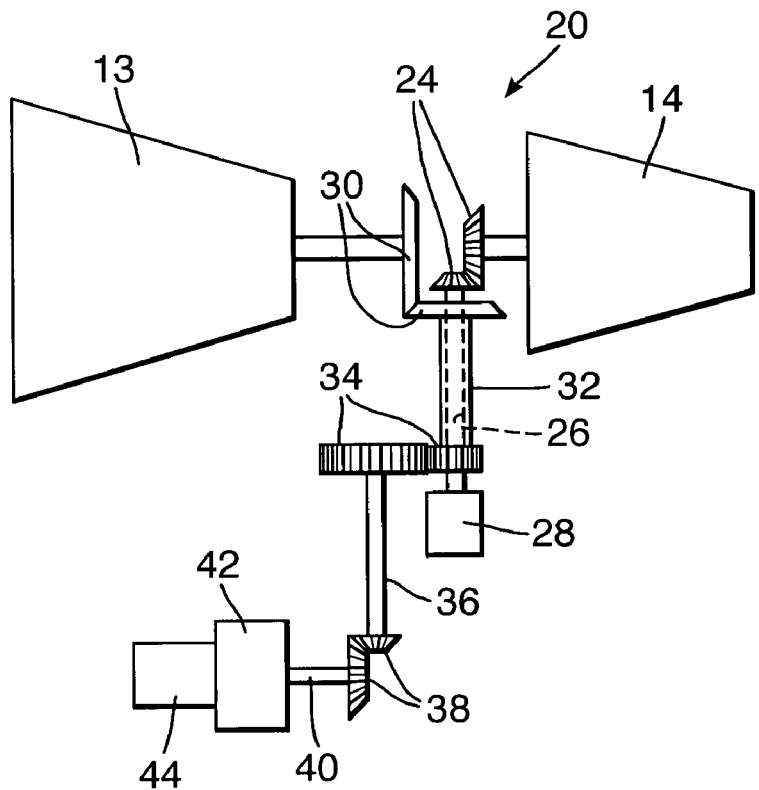
FIGS. 4 and 5 are respectively similar views to FIGS. 2 and 3 but of a gas turbine engine according to the invention.
Figure 5:
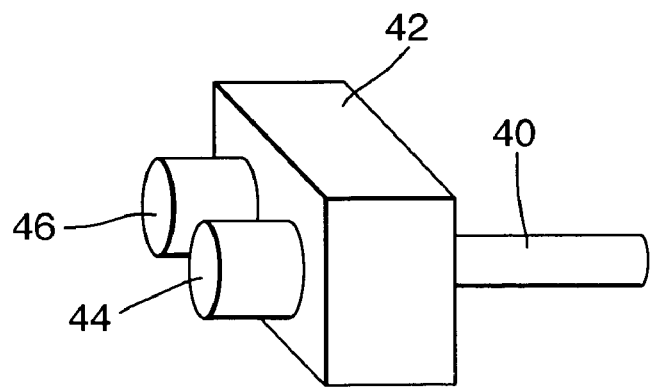

The arrangement 20 is similar to that shown in FIGS. 2 and 3 except as indicated below. Bevelled gears 24 again connect the high pressure compressor 14 to a high pressure radial drive shaft 26. The drive shaft 26 connects to a second hydraulic pump 28 which is configured to act as a motor when pressurised hydraulic fluid is supplied thereto.

The intermediate pressure compressor 13 is connected by bevel gears 30 to an intermediate pressure radial drive shaft 32. The intermediate pressure and high pressure radial drive shafts 32, 26 are concentrically arranged, with the latter located within the former.

The intermediate radial drive shaft 32 connects via gearing 34 to an angled drive shaft 36. The angle drive shaft 36 connects via bevelled gears 38 to a gearbox drive shaft 40 extending from a gear box 42. The gearbox 42 is connected to a starter motor 44 and first hydraulic pump 46.

Figure 6:
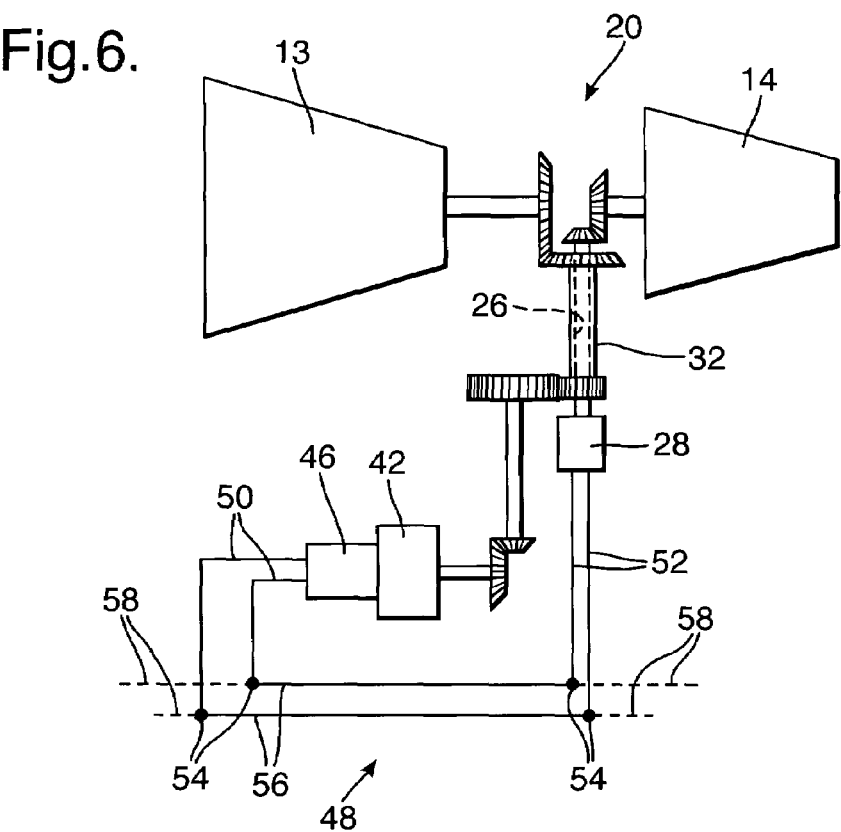
FIGS. 6 and 7 are similar views to FIG. 4 but showing the engine respectively in first and second operating conditions.
Figure 7:
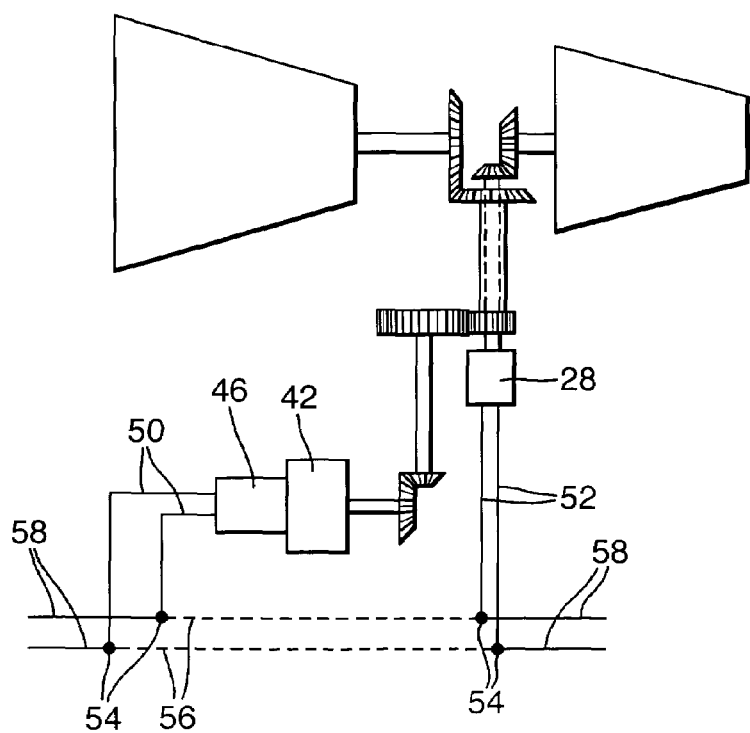

In FIGS. 6 and 7 the starter motor 44 has been omitted for clarity. These figures illustrate a connection arrangement 48 connecting to the first and second hydraulic pumps 46, 28. The arrangement comprises inlet and outlet connections 50 extending from the first pump 46 and inlet and outlet connections 52 extending from the second pump 28. A three way valve 54 is provided on the end of each of the connections 50, 52. Interconnecting connections 56 extend between the respective valves 54. Also connected to the valves 54 are connections 58 which extend to the aircraft hydraulic system.

In use, the valves 56 are switched if necessary to the condition shown in FIG. 6 with the respective connections 50, 52 interconnected via the connections 56. The starter motor 44 is then powered which causes the first pump 46 to pump hydraulic fluid through the connections 50, 56, 52 into the second hydraulic pump 28. This causes the pump 28 to rotate and act as a motor to drive the shaft 26 and hence high pressure compressor 14.

Once the engine 10 is running at idle conditions, the valves 54 are switched to connect the first and second pumps 46, 28 to the aircraft hydraulic system. The pumps 46, 28 will be driven respectively by the intermediate pressure compressor 13 and high pressure compressor 14.

Conventionally the valves 54 would remain in this position for the rest of the flight and during shut down. If however the engine shuts down (flame out) in flight, it can be restarted by returning the valves 54 to the condition shown in FIG. 6, whereby the pumps 46, 28 are interconnected. At this position it may be possible to rely on the windmilling high pressure shaft to power the gearbox 44 and its accessories (a windmill start). Alternatively, if the particular flight conditions dictate that there is insufficient windmill power, then the starter motor 44 can be powered to restart the engine, with the valves 54 returning to the condition shown in FIG. 7 once the engine is again idling.

There is thus provided an arrangement which permits the external gearbox to be driven by the intermediate pressure compressor which prevents the compressor surging at top of descent. The arrangement also connects the high pressure shaft to be driven for starting by interconnecting the hydraulic pumps, thereby alleviating the requirement for a heavy, expensive and potentially unreliable clutch mechanism.

It is to be realised that various modifications may be made without departing from the scope of the invention. For example, the arrangement could be used with either the high and low pressure compressors, or the intermediate and low pressure compressors of the engine. Rather than hydraulic pumps, other energy transfer machines could be used. In which instance, switches could be used rather than three way valves. It may be possible for the starter motor to connect directly to the energy transfer machine for the higher pressure compressor. The arrangement may connect to an aircraft system other than a hydraulic system, which other system may be mechanical or electrical.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An aircraft comprising a power system and a gas turbine engine, the engine including a first compressor and a second compressor of higher pressure than the first compressor; a starter motor; a first energy transfer machine; and a second energy transfer machine,
   wherein the engine also includes first drive means which connects the first compressor to the starter motor and the first energy transfer machine; second drive means which connects the second compressor to the second energy transfer machine; and machine connection means for interconnecting the first energy transfer machine and the second energy transfer machine, and that is also arranged to connect the second energy transfer machine to the aircraft power system, the machine connection means being arranged to be selectively either in a first condition, during start-up of the gas turbine engine, interconnect the first energy transfer machine and the second energy transfer machine to drive the second compressor, or in a second condition connect the second machine to the aircraft power system, and
   wherein the first drive means includes a gearbox which connects to the starter motor and the first energy transfer machine.

2. The aircraft according to claim 1, wherein the first energy transfer machine is connected by the first drive means to the first compressor, and which is connected to the machine connection means.

3. The aircraft according to claim 1, wherein the first and the second drive means includes respective drive shafts which extend substantially perpendicularly from the first and the second compressors.

4. The aircraft according to claim 3, wherein the first compressor is an intermediate pressure compressor, the intermediate pressure compressor and the higher pressure drive shafts are concentric.

5. The aircraft according to claim 3, wherein the gearbox is driven from the first drive shaft.

6. The aircraft according to claim 1, wherein the second compressor is the high-pressure compressor of the engine.

7. The aircraft according to claim 1, wherein the first compressor is the intermediate pressure compressor of the engine.

8. The aircraft according to claim 1, wherein the aircraft power system is an aircraft hydraulic system.

9. The aircraft according to claim 1, wherein the second energy transfer means comprises a pump.

10. The aircraft according to claim 9, wherein the first and the second energy transfer machines comprise respective pumps, and the second pump is configured to act as a motor when supplied with pressurised hydraulic fluid.

11. The aircraft according to claim 1, wherein the machine connection means includes a plurality of three way valves or switches.

12. A method of operating an aircraft, the aircraft comprising a power system and a gas turbine engine, the engine including a first compressor and a second compressor of higher pressure than the first compressor, a starter motor, a first energy transfer machine, and a second energy transfer machine, wherein the engine also includes first drive means which connects the first compressor to the starter motor and the first energy transfer machine; second drive means which connects the second compressor to the second energy transfer machine; and machine connection means for interconnecting the first energy transfer machine and the second enemy transfer machine, and that is also arranged to connect the second energy transfer machine to the aircraft power system, the machine connection means being arranged to be selectively either in a first condition, during start-up of the gas turbine engine, interconnect the first energy transfer machine and the second energy transfer machine to drive the second compressor, or in a second condition connect the second machine to the aircraft power system, and wherein the first drive means includes a gearbox which connects to the starter motor and the first energy transfer machine, the method comprises:

the step of powering the starter motor to cause the first energy transfer machine to power the second machine and thereby drive the higher pressure compressor to start the engine.

13. The method of claim 12 wherein the engine comprises a first pump and a second pump and the machine connection means also interconnects the second machine to an aircraft power system, after the engine has been started, the method comprises the step of connecting the first and second pumps to the aircraft power system to provide power thereto, the pumps being driven by the respective compressors.

* * * * *